US007966483B2

(12) United States Patent
Denpo

(10) Patent No.: US 7,966,483 B2
(45) Date of Patent: Jun. 21, 2011

(54) COMMUNICATION DEVICE

(75) Inventor: Toshiaki Denpo, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 910 days.

(21) Appl. No.: 11/862,888

(22) Filed: Sep. 27, 2007

(65) Prior Publication Data
US 2008/0082852 A1  Apr. 3, 2008

(30) Foreign Application Priority Data

Sep. 29, 2006  (JP) .................................. 2006-269231

(51) Int. Cl.
G06F 12/00 (2006.01)
G06F 13/00 (2006.01)
(52) U.S. Cl. ................ 713/1; 713/2; 713/193; 713/194; 711/100; 711/103; 711/163; 455/410
(58) Field of Classification Search .................. 713/1, 2, 713/193, 194; 711/100, 103, 163; 455/410
See application file for complete search history.

(56) References Cited

U.S. PATENT DOCUMENTS

| 7,519,763 B2 * | 4/2009 | McLean ........................ 711/100 |
| 7,840,997 B2 * | 11/2010 | Shevchenko .................... 726/16 |
| 2003/0154295 A1 * | 8/2003 | Mangold ....................... 709/229 |
| 2006/0004974 A1 * | 1/2006 | Lin et al. ....................... 711/164 |
| 2006/0148449 A1 * | 7/2006 | Budde et al. .................. 455/410 |

FOREIGN PATENT DOCUMENTS

| JP | 10-042035 A | 2/1998 |
| JP | 2000-253457 A | 9/2000 |
| JP | 2000-278748 A | 10/2000 |
| JP | 2004-363732 A | 12/2004 |
| JP | 2005-229471 A | 8/2005 |
| WO | 2004/107718 A1 | 12/2004 |

OTHER PUBLICATIONS

JP Office Action dtd Nov. 4, 2008, JP Appln. 2006-269231.

* cited by examiner

*Primary Examiner* — Abdelmoniem Elamin
(74) *Attorney, Agent, or Firm* — Banner & Witcoff, Ltd.

(57) ABSTRACT

A communication device includes storage configured to store information, an output device configured to output the information, a power supply detector configured to detect a supply of power to the communication device when the communication device is coupled to an external power source. Also, the communication device includes a processor configured to prohibit the stored information from being output by the output device responsive to the power supply detector detecting the supply of power.

20 Claims, 9 Drawing Sheets

Fig.2
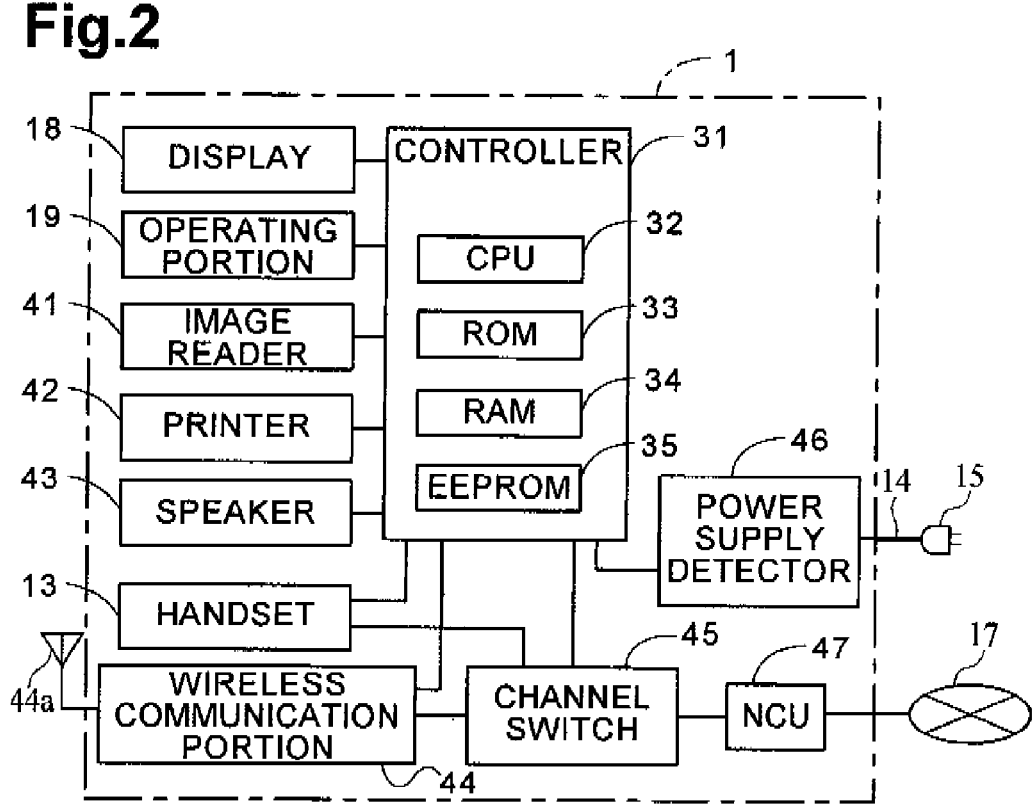
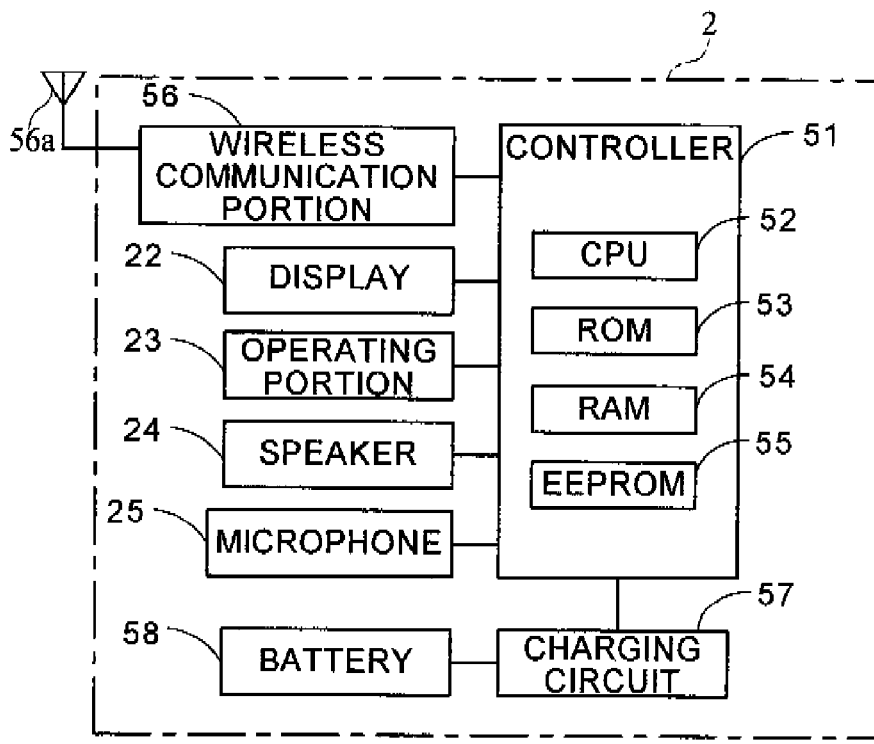

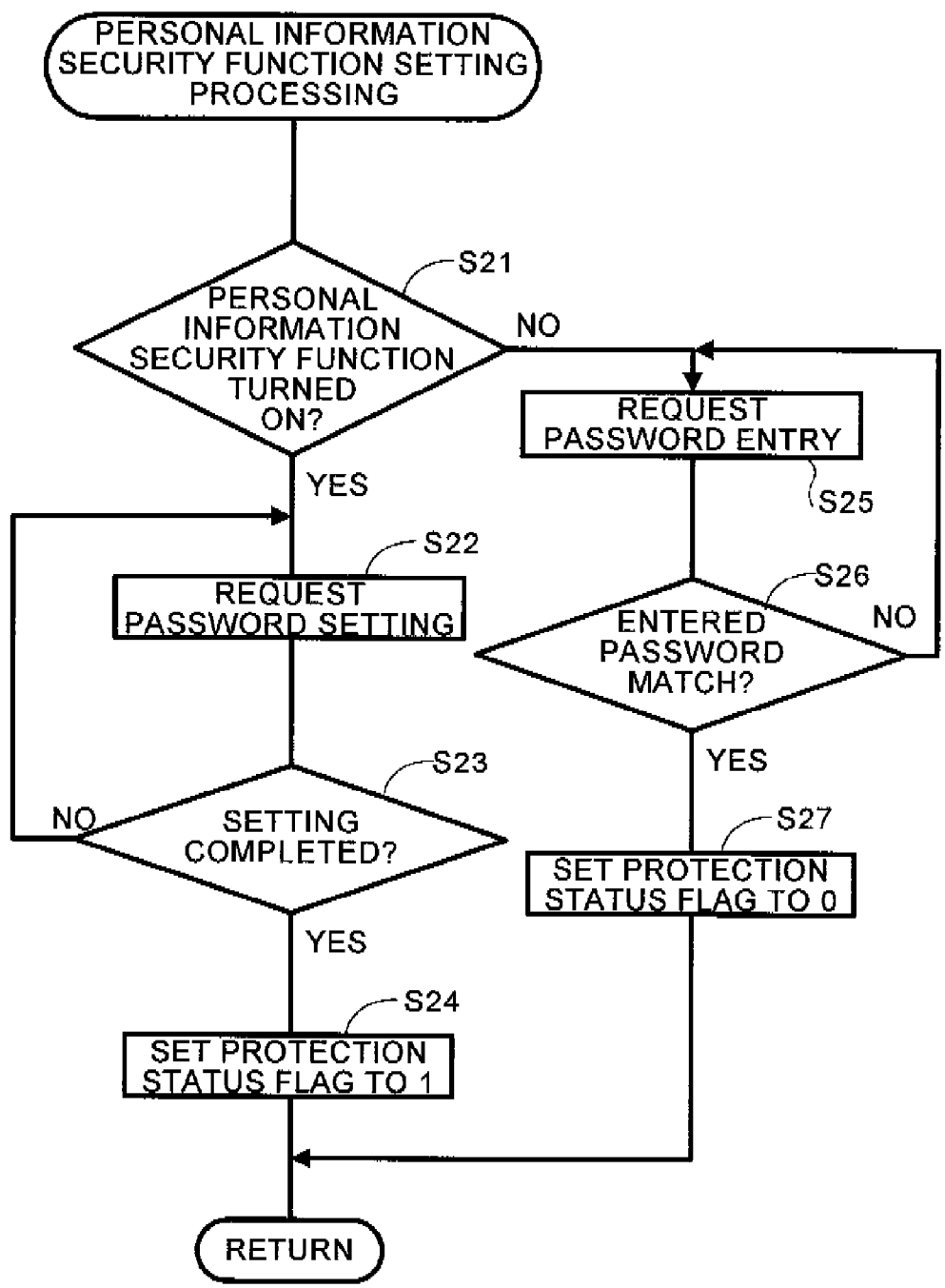

US 7,966,483 B2

COMMUNICATION DEVICE

CROSS REFERENCE TO RELATED APPLICATION

This application claims priority from Japanese Patent Application No. 2006-269231, filed on Sep. 29, 2006, the entire subject matter of which is incorporated herein by reference.

FIELD

Aspects of the invention relate to a communication device including a storage portion that is capable of storing personally identifiable information about the communication device and about external terminals.

BACKGROUND

For example, Japanese Laid-Open Patent Publication No. 2000-253457 discloses a telephone machine or a facsimile machine (hereinafter, referred to as a communication device) that can perform communications with an external terminal via voice or facsimile while connected with a public telephone line. In the communication device, various personal information including telephone numbers and/or facsimile numbers can be stored in a storage portion thereof, as telephone directory data, in addition to a dialed call history and a received call history.

However, for example, if such a communication device is stolen or is given to another person, there is a possibility that the stored personal information may be discovered, accidentally or intentionally, by another person, that is, the personal information may leak out to third parties.

SUMMARY

Illustrative aspects of the invention provide a communication device configured to store personal information and preventing the stored personal information from being released to third parties.

BRIEF DESCRIPTION OF THE DRAWINGS

Illustrative aspects of the invention will be described in detail with reference to the following figures in which like elements are labeled with like numbers and in which:

FIG. 2 is a block diagram showing an internal configuration of the communication device of FIG. 1;

FIG. 4 is a flowchart showing an illustrative control process performed by the base unit;

FIG. 9 illustrates an example of a display screen to be displayed in the;

DETAILED DESCRIPTION

Hereinafter, an illustrative embodiment of the invention will be described with reference to the accompanying drawings.

Figure 1:
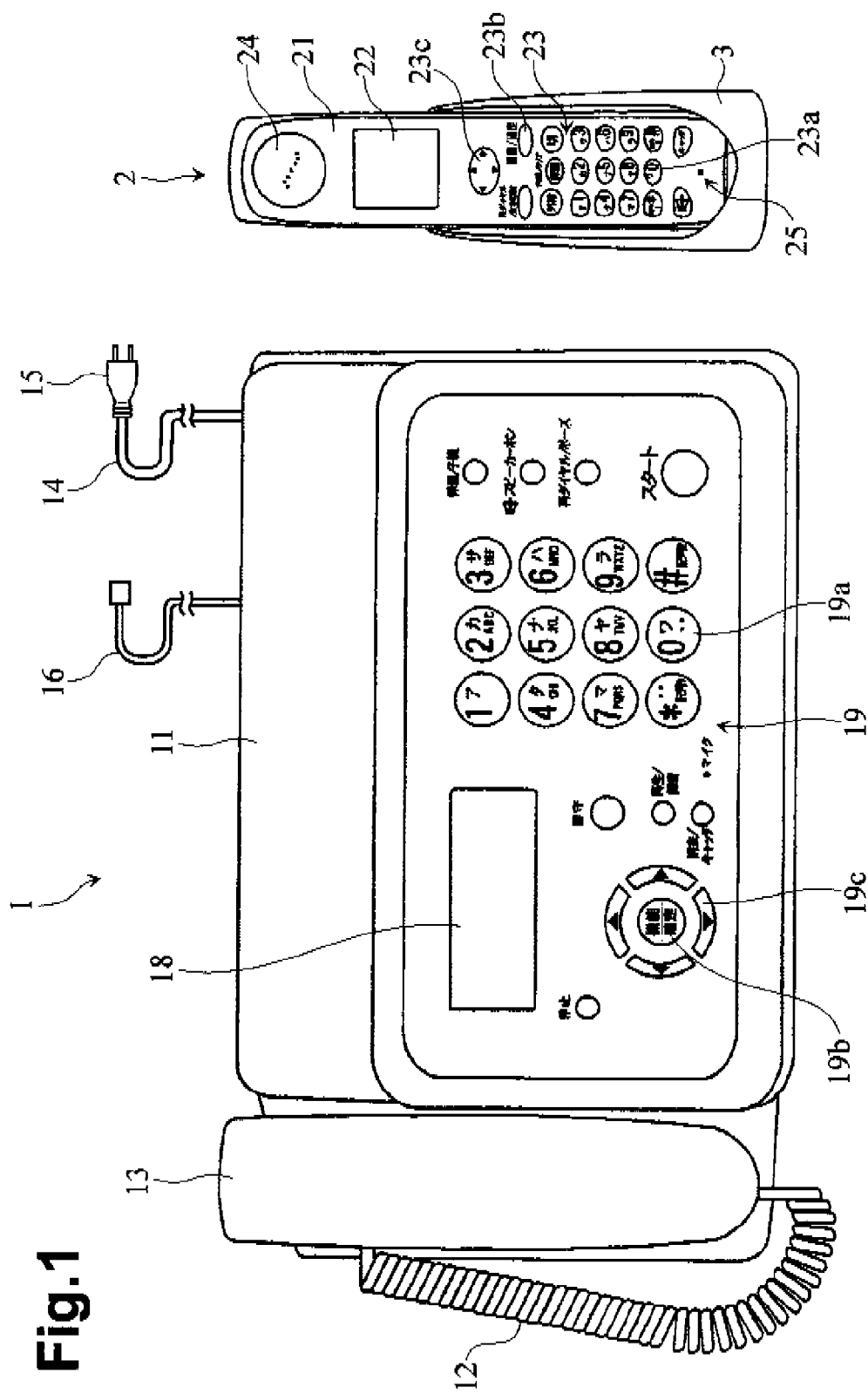
FIG. 1 is a front view showing views of a base unit and a cordless handset as a communication device according to an illustrative embodiment of the invention.

As shown in FIG. 1, a communication device according to the illustrative embodiment includes a base unit 1, which can be a facsimile machine, and a cordless handset 2 that can perform wireless communications with the base unit 1. The communication device may be equipped with several cordless handsets 2 although in this illustrative embodiment, it will be described with a single cordless handset 2.

The base unit 1 can have multiple functions such as an inkjet-type printing function, an image reading function (e.g., a scanning function), and an image data communication function (e.g., a facsimile transmitting/receiving function), in addition to a typical telephone function. For example, the base unit 1 reads a document by using the image reading function and then transmits image data read from the document to an external terminal by using the image data communication function. Further, upon receipt of image data using the communication function, the base unit 1 can print the received image data onto a predetermined recording sheet by using the printing function. The base unit 1 can be used as a printing device or a scanning device while existing in isolation or while being connected to a personal computer. The base unit 1 can be also used as a copying machine by operating the image reading function and the printing function at the same time.

The base unit 1 has a function of storing, in an EEPROM 35 (described later), history data relating to the telephone function, such as a dialed call history and a received call history, and history data relating to the facsimile function, such as a facsimile transmission history and a facsimile reception history. The dialed call history represents calls dialed from the base unit 1 when a user made calls using the telephone function. The received call history represents calls received from external terminals. The facsimile transmission history represents transmission of image data (facsimile data) from the base unit 1. The facsimile reception history represents reception of image data by the base unit 1. The base unit 1 has a so-called memory reception function of storing image data in the EEPROM 35 upon receipt of the image data.

The base unit 1 has a telephone directory function, a one-touch key function or an abbreviated dialing function. The telephone directory function allows telephone numbers and facsimile numbers to be stored in the base unit 1. The one-touch key function or the abbreviated dialing function allows telephone numbers and facsimile numbers to be stored by converting them into abbreviated numbers so that the user can make a call or facsimile transmission with the touch of a key or a few keys. The base unit 1 also has a telephone answering and message recording function to store voice messages as voice data when the user of the communication device cannot answer the telephone.

As described above, the base unit 1 (or the cordless handset 2) can store various information including, such as the dialed call history, the received call history, the facsimile transmission history, the facsimile reception history, the telephone numbers, the facsimile numbers, the abbreviated key numbers used for the one-touch key function and the abbreviated dialing function, the image data received by the memory reception function, and the voice data recorded by the telephone answering and message recording function (hereinafter, this information is collectively referred to as personal information), in storage devices, such as a RAM 34 and the EEPROM 35. The communication device of this illustrative embodiment can prevent the personal information stored therein from being released to another person if, for example, the base unit 1 or the cordless handset 2 is stolen or is given to another person.

The base unit 1 includes a main body 11 and a handset 13 connected with the main body 11 via a coiled cord 12. The main body 11 is connected with a power cord 14 having a power plug 15. The main body 11 is to be supplied with power (e.g. AC 100V) by the user inserting the power plug 15 into an outlet (not shown). The main body 11 is connected with a communication cable 16, through which a public telephone line 17 (described later) is to be connected with the main body 11. The handset 13 is a combined transmitter and receiver which includes a speaker (not shown) for outputting transmitted voice signals and a microphone (not shown) for inputting voice outputted by the user.

The main body 11 of the base unit 1 is provided with a display 18 and an operating portion 19 at its front as shown in FIG. 1. The display 18 includes, for example, a crystal liquid display panel, which is configured to display an operating condition of the base unit 1 and an operation instruction thereon. The operating portion 19 includes dial keys 19*a* for inputting, for example, a telephone number, a function/enter key 19*b* for calling up various functions (menus) and for confirming contents set by the operation, cursor keys 19*c* for switching contents being displayed and for selecting items, and other operating keys.

The cordless handset 2 includes a main body 21 that can be held by the user with one hand. The cordless handset 2 can be placed on a battery charger 3, which can be connected to an outlet (not shown). The cordless handset 2 can be charged via the battery charger 3 connected to the outlet.

The cordless handset 2 includes a display 22 and an operating portion 23 at its front as shown in FIG. 1, like the main body 11 of the base unit 11. The display 22 is configured to display an operating condition of the cordless handset 2 and an operation instruction thereon. The operating portion 23 includes dial keys 23*a* for inputting, for example, a telephone number, a function/enter key 23*b* for calling up various functions (menus) and for confirming contents set by the operation, cursor keys 23*c* for switching contents being displayed and for selecting items, and other operating keys. The cordless handset 2 includes a speaker 24 for outputting voice signals transmitted from the base unit 1 and a microphone 25 for inputting voice outputted by the user.

Referring to FIG. 2, an internal configuration of the communication device of FIG. 1 will be described below.

The base unit 1 includes a controller 31. The controller 31 includes a CPU 32, a ROM 33, the RAM 34, and the EEPROM 35, which are connected with each other via a bus (not shown).

The controller 31 is connected with the display 18, the operating portion 19, an image reader 41, a printer 42, a speaker 43, the handset 13, a wireless communication portion 44, a channel switch 45, and a power supply detector 46. The channel switch 45 is connected with an NCU (network control unit) 47. The NCU 47 is connected with the public telephone line 17 via the communication cable 16. The power supply detector 46 is connected with the power plug 15 via the power cord 14.

The CPU 32 is configured to control the operation of the base unit 1. The ROM 33 stores therein an operation program to be executed by the CPU 32, constants to be used in processing, display data to be displayed on the display 18, and sound data for ringing signals. The RAM 34 provides workspace for the CPU 32. The EEPROM 35 stores various data therein. The various data stored in the EEPROM 35 is read out therefrom as necessary in accordance with instructions from the CPU 32.

The EEPROM 35 stores various personal information, such as the dialed call history, the received call history, the facsimile transmission history, the facsimile reception history, the telephone numbers, the facsimile numbers, the abbreviated key numbers used for the one-touch key function and the abbreviated dialing function, the image data received at the time of receipt of facsimile transmissions, and voice data recorded by the telephone answering and message recording function.

As the dialed call history or the received call history, for example, a dialing date or a received date, a dialed telephone number or a received telephone number, and call duration are stored in the EEPROM 35 in order when a call is made with a party. As the facsimile transmission history or the facsimile reception history, for example, a transmission date or a received date, a total number of pages of documents that have been transmitted or received, a dialed facsimile number or a received facsimile number, and a transmission time or a received time, are stored in the EEPROM 35 in order when facsimile transmission or reception is performed.

The EEPROM 35 can store telephone directory data therein. The user can arbitrarily enter party's names and telephone numbers (or facsimile numbers) by selecting a telephone directory entry function from a menu through key operation on the operating portion 19. In a similar manner, abbreviated key numbers can also be stored in the EEPROM 35 when the user enters the numbers through the operating portion 19. Hereinafter, the personal information stored in the EEPROM 35 is referred to as personal information entry data. As the personal information entry data, only the telephone numbers and facsimile numbers may be stored by user's choice, for example. Although one-touch keys are not shown at the operating portion 19 of the main body 11 of the base unit 1 in FIG. 1, generally, in such a communication device, several keys are often arranged thereon so that the user can dial frequently-used telephone numbers with the touch of a key.

The EEPROM 35 stores therein a value of a security function flag F1 indicating whether a personal information security function is enabled or disabled in the base unit 1. The personal information security function is to protect the personal information, such as telephone numbers and facsimile numbers, from being released to another person, more specifically, to prevent performance of an original function of the communication device under certain conditions (described later) by the user's choice operation. The original function of the communication device is to refer the contents of the telephone directory by the user operating keys through the operating portion 19 to output the personal information entry data.

That is, when the security function flag F1 is "1 (one)", the personal information security function is enabled. Under this condition, even if the user performs an operation to display the personal information entry data on the display 18 while some types of personal information are stored in the EEPROM 35, the personal information entry data is not outputted on the display 18. When the security function flag F1 is "0 (zero)", the personal information security function is disabled. Under this condition, the personal information entry data can be freely outputted by the user's operation.

The setting of the security function flag F1 can be arbitrarily changed by the user. When the personal information security function is set to be disabled (when the protection function flag F1 is set to "0") at all times, the personal information entry data can be freely outputted (e.g., displayed or printed out) by the user's operation at any time. Because there are users who do not need such a security function, the security function flag F1 can be arbitrarily set by user.

The RAM 34 stores therein a value of a protection status flag F2 indicating whether the personal information entry data is protected or unprotected (i.e. whether the base unit 1 is in a personal information protecting state). When the personal information entry data is protected, the user's operation for outputting the personal information entry data is not accepted when there is personal information stored in the EEPROM 35 and the personal information security function is enabled (the security function flag F1 is "1"). While the personal information entry data is protected, the personal information entry data cannot be displayed and/or voice data recorded by the telephone answering and message recording function, which is also referred to as the personal information entry data, cannot be replayed, unless the user enters a valid password.

That is, the protection status flag F2 is used to determine whether a request for password entry is made to the user when the user performs an operation for outputting the personal information entry data. The protection status flag F2 is set to "1" to represent that the personal information entry data is protected, when the power plug 15 is engaged in the outlet and the personal information security function is enabled while there is personal information stored in the EEPROM 35. When the user enters a valid password, the protection status flag F2 is changed to "0" from "1" to represent that the protection of the personal information entry data is removed in the base unit 1. As described above, the protection status flag F2 can be changed under certain conditions. In contrast to the security function flag F1, the protection status flag F2 cannot be arbitrarily changed by the user. Once the protection status flag F2 is changed to "0", the user can freely output the personal information entry data.

The EEPROM 35 stores therein the password information to accept the user's operation for outputting the personal information entry data when the protection status flag F2 is "1". The password is identification data including, for example, several digit numbers or a combination of numbers and alphabets. The password is set by the user in advance and the set password is stored in the EEPROM 35. When the user desires to remove the protection of the personal information entry data, that is, when the status of the base unit 1 is desired to be changed to accept the user's operation for outputting the personal information entry data, the user enters the numbers and/or alphabets that are the same as the set password. Then, the protection of the personal information entry data is removed.

The above password is the same as that used to enable the personal information security function (which is set by the security function flag F1). That is, the personal information security function has been set to be disabled when the communication device was shipped from the plant. Therefore, when the user desires to change the personal information security function to be enabled after purchasing the communication device, the user enters desired numbers and/or letters for a password setting to change the personal information security function to be enabled. The set password is then stored in the EEPROM 35 and can be used going forward. The password to be used to change the status (enabled state or disabled state) of the personal information security function may be different from the password to be used to remove the protection of the personal information entry data in the base unit 1.

To remove the protection of the personal information entry data, a special key operation may be performed instead of the password entry (for example, an operating key arranged on the operating portion 19 is pressed and held for several seconds).

As shown in FIG. 1, the display 18 is configured to display thereon the setting menus and the operation guide, by which display data is read out from the ROM 33 in accordance with the instructions of the CPU 32.

The operating portion 19 has various operating keys as shown in FIG. 1. When the user presses any of the various operating keys, the pressing of the key is transmitted to the CPU 32 and processing according to the pressed key is performed by the CPU 32.

The image reader 41 includes an image sensor, an LED light source and a document feed motor (all not shown), and is configured to read an image from a facsimile document in accordance with the control of the CPU 32.

The printer 42 is configured to print an image including characters/letters or figures in monochrome or color in thermal printing or inkjet printing.

The speaker 43 is configured to output voice data as an instruction message when the telephone answering and message recording function is set, and received voice data recorded by the telephone answering and message recording function. The speaker 43 is configured to replay those voice data in accordance with the control of the CPU 32.

The wireless communication portion 44 includes an antenna 44a, and is configured to exchange data including voice signals and various control signals with the cordless handset 2 by using a control channel and a call channel.

The channel switch 45 is configured to switch between a channel for voice signals and a channel for data signals. For example, when the corded handset 13 is off-hook by the user, the corded handset 13 and the public telephone line 17 are connected with each other via the NCU 47. When the cordless handset 2 makes a request to connect to the public telephone line 17, the channel switch 45 switches the channel so as to connect the cordless handset 2 with the public telephone line 17 via the wireless communication portion 44 and the NCU 47. When a facsimile signal is received from the public telephone line 17, the channel switch 45 switches the channel so as to connect the NCU 47 (the public telephone line 17) and the controller 31 (the printer 42) with each other.

The NCU 47 is configured to perform network control by connecting to the public telephone line 17.

The power supply detector 46 is configured to detect supply of power. More specifically, the power supply detector 46 is configured to detect the supply of power to the main body 11 by insertion of the power plug 15 of the power cable 14 into an outlet.

The power supply detection is implemented by a real-time clock function, for example. A real-time clock is configured to measure a time between the instant when the power plug 15 is removed from an outlet to stop the supply of power to the main body 11 and the instant when the power plug 15 is inserted into an outlet to start the supply of power to the main body 11 again. When the main body 11 of the base unit 1 is supplied with power after time being measured by the real-time clock reaches or exceeds a predetermined time (e.g. 3 minutes), the power supply detector 46 detects that the power plug 15 of the main body 11 of the base unit 1 is inserted into the outlet of power by the user and power is supplied to the main body 11. The power supply detector 46 can be powered by a battery provided in the base unit 1.

Some models of communication devices may have power switches on the surface of their main body.

The cordless handset 2 may be installed at a place different from a place where the base unit 1 is installed. For example, the base unit 1 can be installed in a living room and the cordless handset 2 can be installed in a child's room in a house. As shown in FIG. 2, the cordless handset 2 includes a controller 51. The controller 51 includes a CPU 52, a ROM 53, a RAM 54 and an EEPROM 55, which are connected with each other via a bus. The controller 51 is connected with a wireless communication portion 56, the display 22, the operating portion 23, the speaker 24, the microphone 25, the battery 58 and a charging circuit 57.

The CPU 52 is configured to control the operation of the cordless handset 2. The ROM 53 stores therein an operation program to be executed by the CPU 52, constants to be used in processing, display data to be displayed on the display 22, and sound data for ringing signals. The RAM 54 provides workspace for the CPU 52. The EEPROM 55 stores various data therein. The various data stored in the EEPROM 55 is read out therefrom as necessary in accordance with instructions made by the CPU 52.

The EEPROM 55 stores therein various personal information, such as the dial call history and the received call history when a call is made with a party through the cordless handset 2, telephone numbers entered through the cordless handset 2, and the abbreviated key numbers used for the one-touch key function. If several cordless handsets 2 are provided and each of the cordless handsets 2 has a telephone directory, in each of the cordless handsets 2, telephone numbers as the telephone directory data are stored in the EEPROM 55 by the user entering the telephone numbers through the operating portion 23, in the similar manner to the case of the base unit 1. The personal information entry data (particularly, the telephone numbers and abbreviated key numbers) stored in the base unit 1 (the EEPROM 35) may be transferred to the cordless handset 2 as they are such that the cordless handset 2 may store in the EEPROM 55 the same contents as those stored in the base unit 1 (the EEPROM 35) as the personal information entry data.

The EEPROM 55 stores therein a value of a security function flag F3 indicating whether a personal information security function is enabled or disabled in the cordless handset 2. When the security function flag F3 is "1", the personal information security function is enabled in the cordless handset 2. Under this condition, the personal information entry data stored in the EEPROM 55 cannot be outputted by the user's operation. When the security function flag F3 is "0", the personal information security function is disabled in the cordless handset 2. Under this condition, the personal information entry data stored in the EEPROM 55 can be freely outputted by the user's operation. The setting of the security function flag F3 can be also arbitrarily changed by the user.

The EEPROM 55 stores therein password information to accept the user's operation for outputting the personal information entry data when the security function flag F3 is "1". The password is identification data including, for example, several digit numbers or a combination of numbers and alphabets. The password is set by the user in advance and the set password is stored in the EEPROM 55. When the user desires to remove the protection of the personal information entry data, the user enters the numbers and/or letters corresponding to the set password. Then, the protection of the personal information entry data is removed. The password to be used in the cordless handset 2 may be the same as or different from the password to be used in the base unit 1.

As shown in FIG. 1, the display 22 is configured to display thereon the setting menus and the operation instructions, by which display data is read out from the ROM 53 in accordance with the instructions of the CPU 52.

The operating portion 23 has various operating keys as shown in FIG. 1. When the user presses any of the various operating keys, the pressing of the key is transmitted to the CPU 52 and processing according to the pressed key is performed by the CPU 52.

The wireless communication portion 56 includes an antenna 56a, and is configured to exchange data including voice signals and various control signals with the base unit 1 or another cordless handset 2 by using a control channel and a call channel. The cordless handset 2 has an out-of-range detecting function of detecting whether the cordless handset 2 exists within a predetermined distance from the installed location of the base unit 1 and the cordless handset 2 can communicate with the base unit 1.

The speaker 24 and the microphone 25 are configured to implement calls between the cordless handset 2 and the base unit 1, between the cordless handset 2 and another cordless handset 2, or between the cordless handset 2 and an external communication device via the base unit 1 and the public telephone line 17.

Figure 3A:
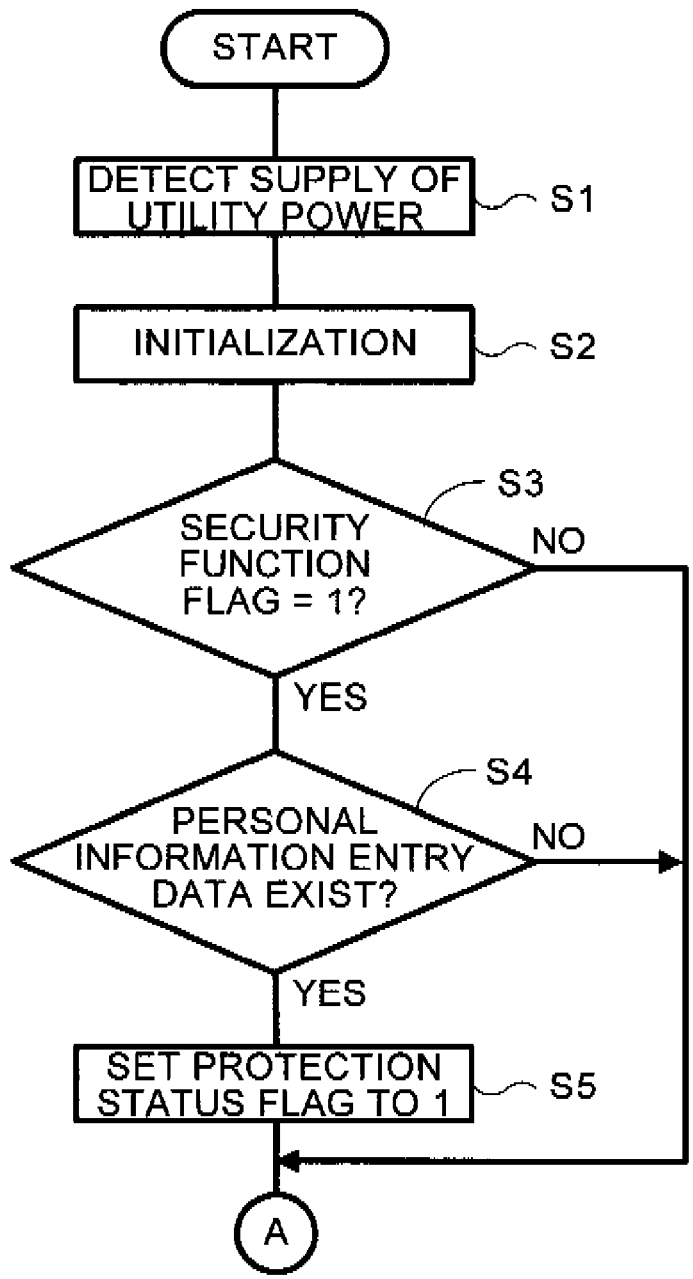
FIG. 3A is a flowchart showing an illustrative control process performed by the base unit.
Figure 3B:
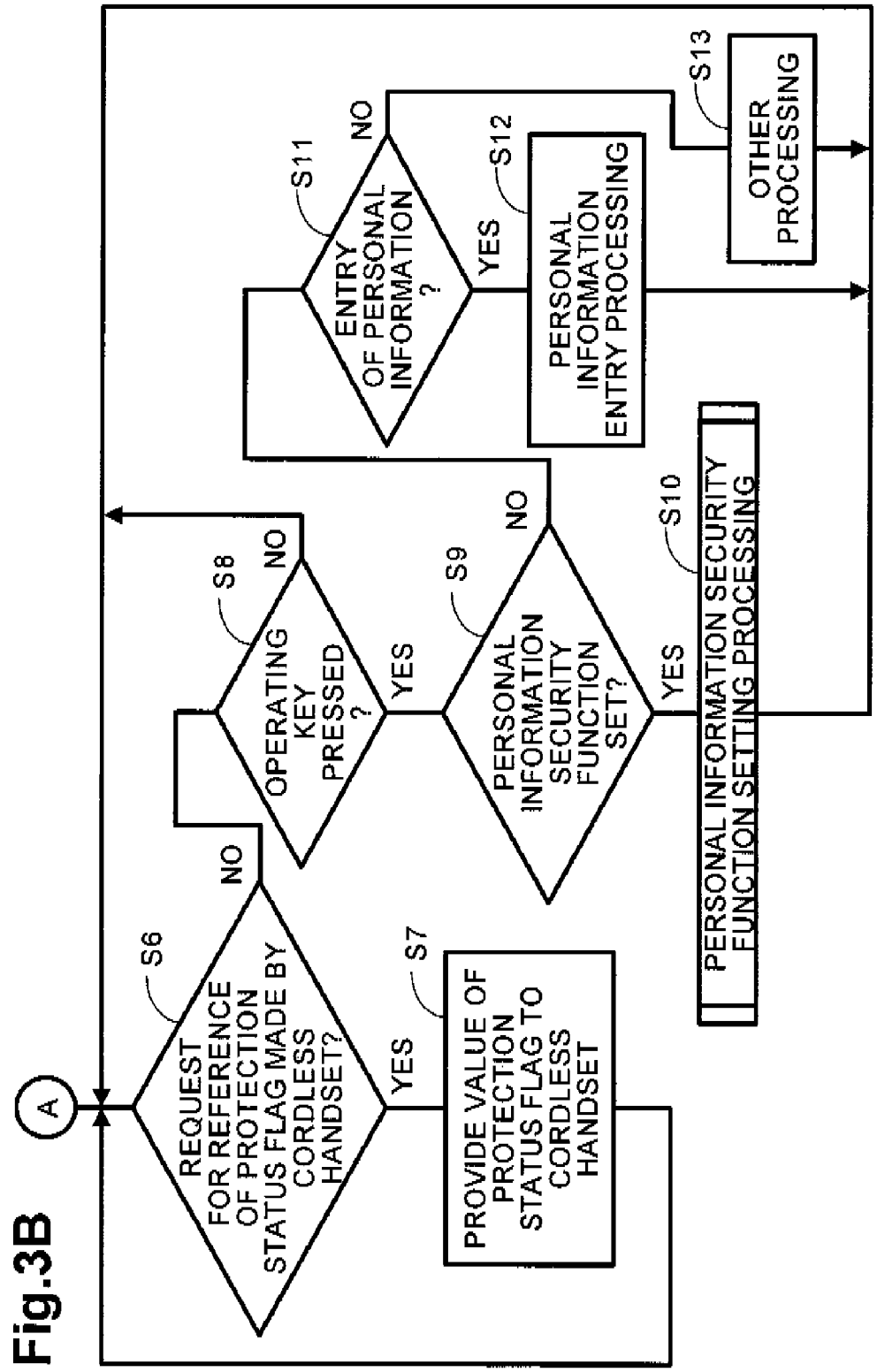
FIG. 3B is a flowchart continued from FIG. 3A.

Next, the control operation performed in the communication device configured as described above will be described with reference to FIGS. 3A and 3B. A flowchart of FIGS. 3A and 3B shows the control to be performed at the time power is supplied to the communication device. The communication device of the illustrative embodiment is configured to protect the personal information entry data from being released to another person if, for example, the communication device is stolen or is given to another person. In such cases, it is assumed that the power plug 15 of the communication device is removed from the outlet in the originally-installed location and then is inserted into a different outlet in another place. The communication device of the illustrative embodiment is configured such that the personal information entry data cannot be accessed even if power is resupplied to the communication device after a predetermined time has elapsed.

First, when the power plug 15 of the base unit 1 is inserted into a outlet with the base unit 1 being not supplied with power, the power supply detector 46 detects the supply of power (a step S1, hereinafter, S stands for a step). At this detecting processing, the real-time clock function is used. The real-time clock is configured to measure a time between the instant when the power plug 15 is removed from the outlet to stop the supply of power to the main body 11 and the instant when the power plug 15 is inserted into an outlet to start the supply of power to the main body 11 again. In this illustrative embodiment, when time being measured by the real-time clock exceeds a predetermined time (e.g. 3 minutes), the power supply detector 46 detects that the power plug 15 of the main body 11 of the base unit 1 is inserted into the outlet of power by the user and power is supplied to the main body 11. That is, it can be assumed that the predetermined time has elapsed when the communication device is stolen or is given to another person. For example, in a case where the power plug 15 is immediately inserted into an outlet if the power plug 15 is accidentally pulled out from the outlet, it can be assumed that the predetermined time has not elapsed. Therefore, when power is supplied to the main body 11 of the base unit 1 within the predetermined time after the power plug 15 is pulled out from the outlet, the detection of S1 is not applicable.

The determination processing performed by the real-time clock does not determine whether a press-type power switch (not shown) of the main body 11 is turned on from off. That is, the real-time clock function does not activate even when the power switch is turned off.

Upon supply of power to the main body 11 of the base unit 1, the CPU 32 starts up to perform initialization to read out the operation program stored in the ROM 33 and check the memory contents of the RAM 34 (S2).

Then, the CPU 32 determines whether the security function flag F1 is "1" (S3), that is, whether the personal information security function is enabled. This determination processing of S3 is performed because the setting of the personal information security function can be arbitrarily determined in the communication device by the user in advance whether to be enabled or disabled. At the time when the user purchases the communication device, the personal information security flag F1 has been set to "0", so that the personal information security function is disabled.

When the security function flag F1 is "1" (S3: YES), that is, when the personal information security function is enabled, the CPU 32 determines, with reference to the EEPROM 35, whether any personal information has been stored (or entered) in the EEPROM 35 (S4).

At S4, when the CPU 32 determines that the personal information has been stored in the EEPROM 35 (S4: YES), the protection status flag F2, which represents whether the personal information entry data is protected (i.e. whether the base unit 1 is in the personal information protecting state), is set to "1" (S5). The presence or absence of the personal information entry data in the EEPROM 35 is confirmed at S4 because there is no use in changing the status of the base unit 1 to the personal information protecting state if there is no personal information entry data to be protected in the EEPROM 35. The CPU 32 determines that the base unit 1 has been changed to the personal information protecting state by setting the protection status flag F2 to "1".

At S3, when the security function flag F1 is "0" (S3: NO), that is, when the personal information security function is disabled, processing proceeds to S6. At S4, when the CPU 32 determines that there is no personal information entry data stored in the EEPROM 35 (S4: NO) although determined that the security function flag F1 is "1" at S3 (S3: YES), processing proceeds to S6.

At S6, the CPU 32 determines whether the cordless handset 2 has made a request for a reference of the value of the protection status flag F2. When it is determined that the request has been made (S6: YES), the value of the protection status flag F2 is provided to the cordless handset 2 (S7). Then, processing goes back to S6. The processing of S6 and S7 is to confirm the status of the personal information entry data through the cordless handset 2 whether the personal information entry data stored in the base unit 1 is protected, when a request for output of the personal information entry data is made by the cordless handset 2 (to be described later). That is, in this illustrative embodiment, the status of the personal information entry data set in the base unit 1 is reflected on the cordless handset 2.

At S6, when it is determined that the request has not been made (S6: NO), the CPU 32 determines whether any operating key arranged on the operating portion 19 has been pressed by the user (S8).

When it is determined that an operating key has been pressed (S8: YES), the CPU 32 then determines whether a setting made by the pressed operating key is related to the personal information security function (S9). More specifically, for example, the determination of S9 is made whether an item of "personal information security function setting" is selected from function items (menu items) by which the function/enter key 19*b* and/or the cursor keys 19 in the operating portion 19 are pressed.

At S9, when the item of "personal information security function setting" is selected (S9: YES), processing proceeds to personal information security function setting processing (S10).

Referring to FIG. 4, the personal information security setting processing will be described. At S21, setting determination processing is performed to determine whether the personal information security function is changed to be enabled (or is turned on). In the setting determination processing, for example, a message screen shown in FIG. 5 is displayed on the display 18 to request the user to select whether the personal information security function is enabled or disabled.

Figure 5:
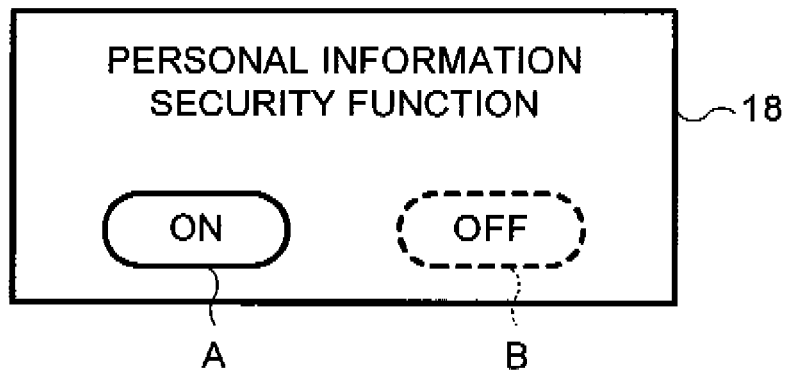
FIG. 5 illustrates an example of a display screen to be displayed in a display.

In FIG. 5, "ON" (indicating that the personal information security function is enabled) enclosed with a solid line A is selected and "OFF" (indicating that the personal information security function is disabled) enclosed with a dashed line B is not selected. In this state, a right arrow key or a left arrow key of the cursor keys 19 is pressed to select a desired option and the function/enter key 19*b* is then pressed to enter the selected option. The option selected and enclosed with the solid line A at that time is accepted and stored in a predetermined area of the EEPROM 35.

Figure 6:
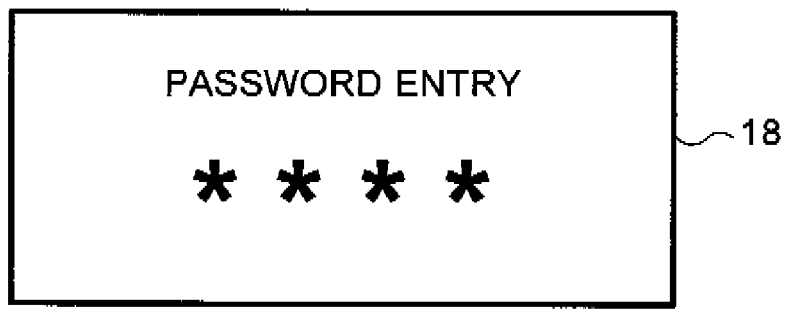
FIG. 6 illustrates an example of a display screen to be displayed in the display.

When it is determined that the personal information security function is set to be enabled (is turned on) (S21: YES), a request for a setting of a password is made to the user (S22). For example, a message screen shown in FIG. 6 is displayed on the display 18. When a desired password is inputted by the user who operated the dial keys 19*a* in the operating portion 19 and pressed the function/enter key 19*b*, it is determined that the setting of the password has been completed (S23: YES) and the password has been set. After that, the CPU 32 sets the security function flag F1 to "1" and determines that the personal information security function is enabled.

Figure 7:
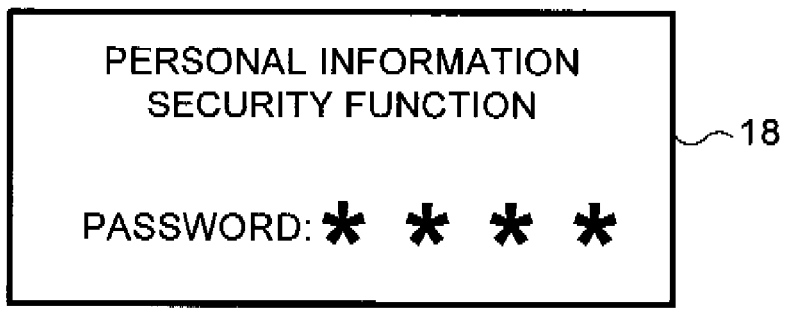
FIG. 7 illustrates an example of a display screen to be displayed in the display.

At S21, when it is determined that personal information security function is changed to be disabled (S21: NO), for example, a message screen shown in FIG. 7 is displayed on the display 18 and an entry of the password is requested (S25). When the password is entered by the user who operated the dial keys 19*a* in the operating portion 19, it is determined whether the currently-entered password matches with the set password used to change the personal information security function to be enabled (S26). When the both passwords match with each other (S26: YES), the CPU 32 sets the security function flag F1 to "0" (S27) and determines that the personal information security function is disabled.

Back to FIG. 3B, in the determination processing at S9, when the option of "personal information security function setting" has not been selected (S9: NO), the CPU 32 determines whether the setting made by the pressed operating key is related to a setting for an entry of personal information, such as telephone numbers or facsimile numbers (S11). For example, the determination is made whether a setting item for entering personal information is selected from function items (menu items) by which the function/enter key 19*b*, the cursor keys 19, and/or the dial keys 19*a* in the operating portion 19 are pressed.

At S11, when it is determined that the selected item is related to the entry of personal information (S11: YES), processing proceeds to personal information entry processing (S12). Information entered at the personal information entry processing is to be stored in a predetermined area of the EEPROM 35. For example, a telephone number or a facsimile number is newly entered in the telephone directory. The entered information is stored in a telephone directory entry area of the EEPROM 35. In addition to the telephone numbers and the facsimile numbers, the personal information includes abbreviated key numbers indicating telephone numbers or facsimile numbers. The personal information may also include e-mail addresses if an environment allows the use of the Internet.

At S11, when it is determined that the selected item is not related to the entry of personal information (S11: NO), processing proceeds to S13 to perform other processing, which includes call processing (an outside call) and extension call processing.

As described above, in this illustrative embodiment, in a case where there is personal information entry data stored in the EEPROM 35 at the time the supply of power is started while the security function flag F1 has been set to "1", the protection status flag F2 is set to "1". Once the protection status flag F2 is set to "1", the personal information entry data stored in the EEPROM 35 cannot be outputted unless a valid password is entered.

It is assumed that if the communication device is stolen or is given to another person, the power plug 15 of the communication device is removed once from the outlet in the originally installed location and the power plug 15 of the communication device is then inserted into an outlet in another place after a certain amount of time has passed. In this case, as described above, because the protection status flag F2 has been set to "1", the personal information entry data cannot be outputted unless a valid password is entered. A third party would likely not know the valid password. Therefore, there is little possibility that the third party can output the personal information entry data. Accordingly, the personal information entry data can be protected from being released to third parties.

Briefly speaking, aspects of the invention prevent the release of personal information entry data by limiting the outputting operation while the personal information entry data is stored in the communication device, but not by forcefully erasing the personal information entry data from the communication device.

The personal information entry data cannot be accessed by another person if all of the personal information entry data is cleared before the communication device is given to another person. In case the communication device is given to another person without clearing the personal information entry data, another person would not likely be able to access the personal information entry data if the security function flag F1 has been set to "1".

The power supply detector 46 is configured to detect the supply of power by using the real-time clock function. The power supply detector 46 determines that the resupply of power is not performed due to, for example, stealing of the communication device when the power plug 15 of the main body 11 is inserted into an outlet within the predetermined time (e.g. 3 minutes) after pulled out once from the outlet. That is, the resupply of power due to, for example, an accidental removal of the power plug 15 from the outlet or displacement of the communication device to a different place, is distinguished from the resupply of power due to theft or a transfer of the communication device. By doing so, the password entry is not requested in those cases, so that the user does not have to enter his password.

Figure 8:
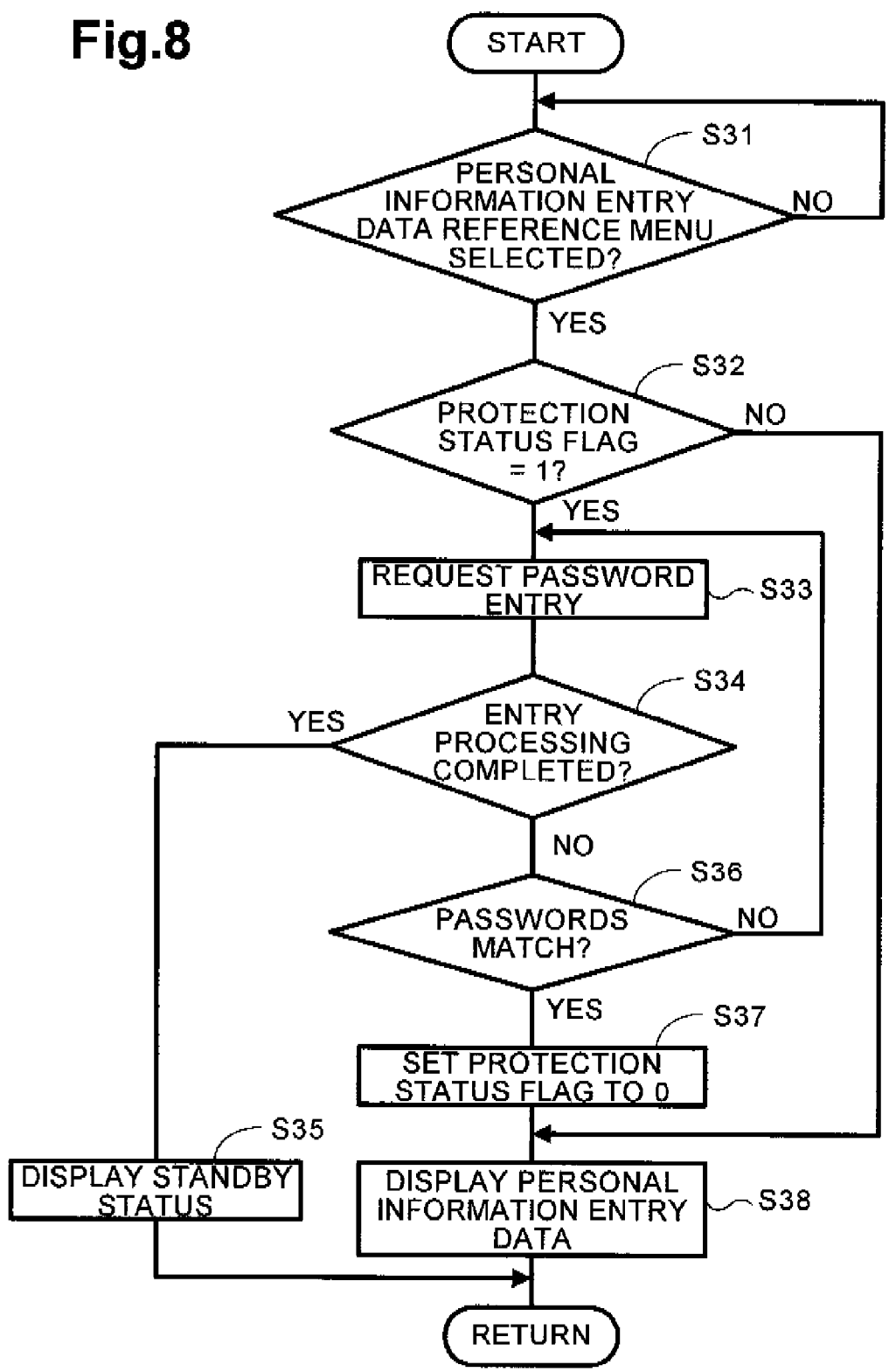
FIG. 8 is a flowchart showing an illustrative control process performed by the base unit.

Referring to FIG. 8, a control operation to be implemented when the user refers to the personal information entry data will be described. The description will be made assuming that a password has been set by the user.

The CPU 32 determines whether a personal information entry data reference menu is selected by the user (S31). When the reference menu is selected (S31: YES), the CPU 32 determines whether the protection status flag F2 is "1" (S32). When the protection status flag F2 is "1" (S32: YES), a request for a password entry is made to the user (S33) because the base unit 1 is in the personal information protecting state so that the personal information entry data cannot be accessed.

In this case, for example, a message screen shown in FIG. 7 is displayed on the display 18 to request the user to enter the password. The user enters the same password as the set password by operating the dial keys 19a in the operating portion 19 in accordance with the message screen.

Then, the CPU 32 determines whether the password entry processing is completed (S34). In particular, the determination at S34 is made in accordance with a pressing of a special key by the user, for example. That is, when the user does not need to refer to the personal information entry data although the message screen for the password entry is displayed on the display 18, the user presses the special key to end the password entry processing. In this case, a display representing a standby status (for example, a date and current time) is displayed on the display 18 (S35), and then this processing is finished.

When the password entry processing is not completed (S34: NO), matching confirmation processing is performed to determine whether the password currently entered by the user matches the set password stored in the EEPROM 35 (S36). When the entered password does not match the stored password (S36: NO), processing goes back to S33 for the password entry processing. It may be configured that the password entry processing will be forcefully ended if an invalid password is entered three consecutive times.

Figure 9:
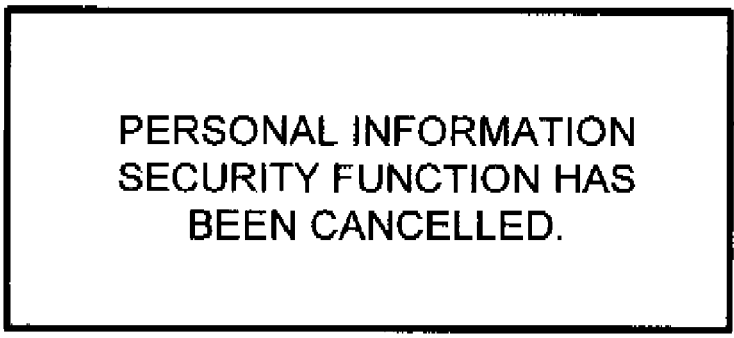
Figure 10:
FIG. 10 illustrates an example of a display screen to be displayed in the display.

When the entered and stored passwords match with each other (S36: YES), the protection status flag F2 is set to "0" (S37). By doing so, the protection of the personal information entry data is removed and a message screen for notifying the removal of the protection of the personal information entry data is displayed on the display 18 as shown in FIG. 9. Then, at S31, the personal information entry data corresponding to the menu to which the user desires to access can be displayed. For example, if the user desires to access the last dialed call, a telephone number called the last time is displayed as shown in FIG. 10 (S38). At S32, when the protection status flag F2 is "0" (S32: NO), that is, when the base unit 1 is not in the personal information protecting state, the personal information entry data corresponding to the menu to which the user desires to access is displayed on the display 18 (S38).

As described above, when the user desires to access the personal information entry data by displaying the information on the 18, the protection of the personal information entry data can be removed by the user entering the password that matches with the set password. That is, to remove the protection of the personal information entry data, it is necessary to know the set (valid) password. Therefore, another person who does not know the valid password cannot remove the protection of the personal information entry data, and thus cannot access the personal information entry data. Accordingly, the personal information entry data can be protected from being released to another person. Once the protection of the personal information entry data is removed by the entry of the valid password, the communication device can be normally operated without requesting the password entry unless the power plug 15 is pulled out from the outlet for a certain time.

When a special operation for clearing all of the personal information entry data is performed by the user in the base unit 1, all of the personal information entry data stored in the EEPROM 35 and the RAM 34 are erased therefrom. At that time, the security function flag F1 is set to "0" to cancel the personal information security function because there is no personal information entry data to be protected in the EEPROM 35 and the RAM 34 after the clearance of all of the personal information entry data.

Figure 11:
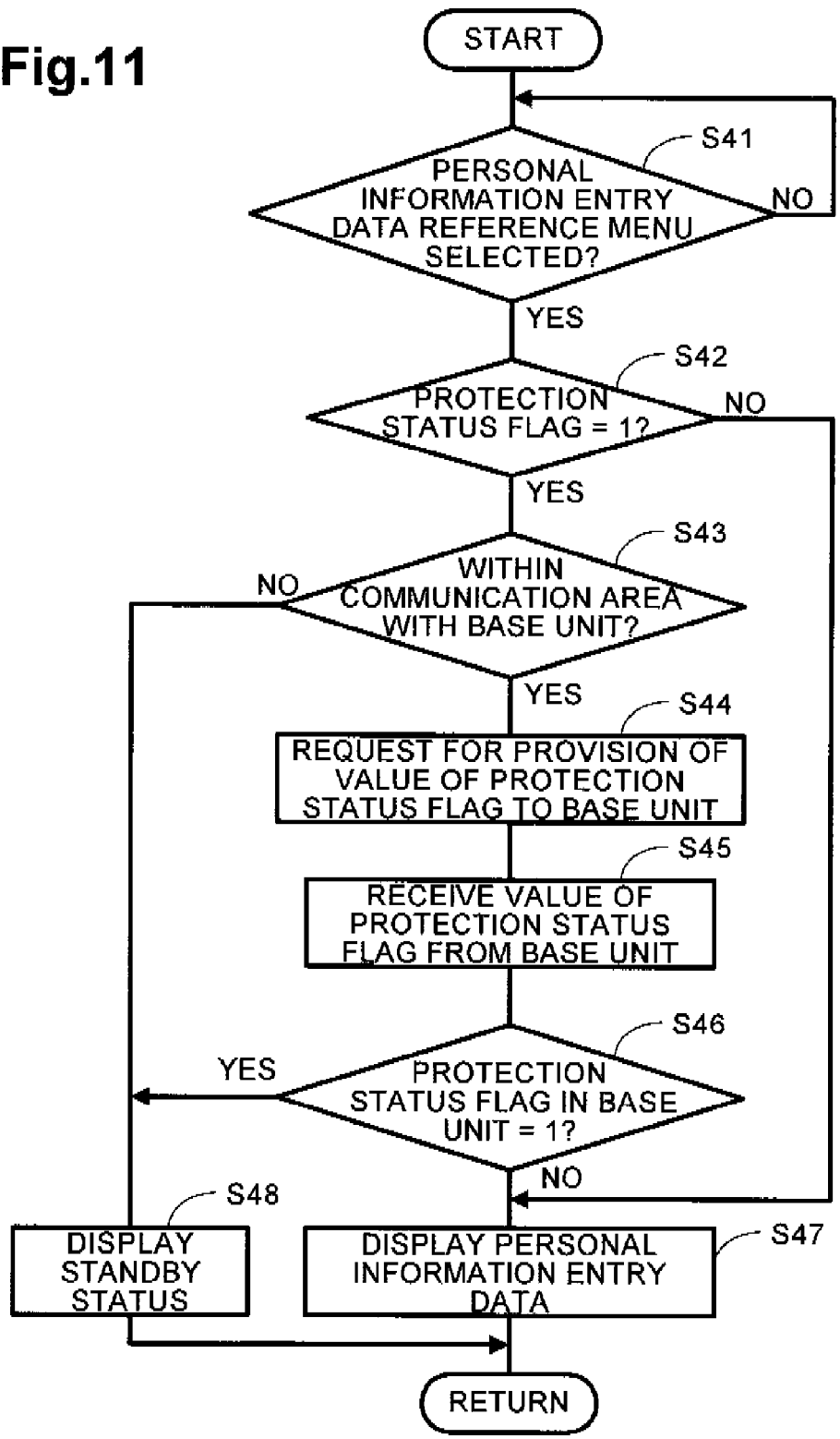
FIG. 11 is a flowchart showing an illustrative control process performed by the cordless handset.

Referring to FIG. 11, a control operation to be implemented by the cordless handset 2 will be described. A flowchart of FIG. 11 shows a control process to be performed when the personal information entry data stored in the cordless handset 2 is to be accessed, but does not show a whole operation of the cordless handset 2. Although not shown in FIG. 11, in the cordless handset 2, the setting of whether the personal information security function is enabled can be performed by the user. At that time, for example, the password setting and the password entry are performed similar to the control process performed in the base unit 1 shown in FIG. 4.

The CPU 52 of the cordless handset 2 determines whether a personal information entry data reference menu is selected (S41). When the reference menu is selected (S41: YES), the CPU 52 determines whether the security function flag F3 stored in the EEPROM 55 is "1", that is, whether the personal information security function is enabled (S42).

When the security function flag F3 is "1", that is, the personal information security function is enabled (S42: YES), the CPU 52 determines whether the cordless handset 2 itself is located within an area allowable to communicate with the base unit 1 (S43). When the cordless handset 2 tries to communicate with the base unit 1, it is determined whether the cordless handset 2 is located within the area for communication with the base unit 1 in advance. At S43, the same operation is performed to determine whether the cordless handset 2 can be connected with the base unit 1 for communication.

When the cordless handset 2 is within the area for communication (S43: YES), the cordless handset 2 outputs a signal to the base unit 1 to request the base unit 1 to provide with the current value of the protection status flag F2 of the base unit 1 (S44). Then, the cordless handset 2 receives the value of the protection status flag F2 sent from the base unit 1 (S45), the CPU 52 determines whether the protection status flag F2 is "1", that is, whether the base unit 1 is in the personal information protecting state (S46).

When the protection status flag F2 is "0" (S46: NO), that is, the base unit 1 is not in the personal information protecting state, the personal information entry data based on the menu selected at S41, for example, a telephone number of the received call, is displayed on the display portion 22 (S47). At S42, when the security function flag F3 is "0" (S42: NO), that is, the personal information security function is disabled, the personal information entry data based on the menu selected at S41 is displayed on the display 22 (S47).

When the protection status flag F2 is "1" (S46: YES), that is, the base unit 1 is in the personal information protecting state, a display representing a standby status (for example, a date and current time) is displayed on the display 22 (S48) and access to the personal information entry data by the cordless handset 2 is prohibited. At S43, when it is determined that the cordless handset 2 is not within the area for communication (S43: NO), the display representing the standby status is displayed on the 22 (S48) and access to the personal information entry data by the cordless handset 2 is prohibited.

As described above, when the base unit 1 is in the personal information protecting state, access to the personal information entry data is prohibited in the cordless handset 2. Therefore, if the cordless handset 2 is stolen or is given to another person, the personal information entry data stored in the cordless handset 2 is not released to another person.

While the cordless handset 2 is out of the area for communication range with the base unit 1, access to the personal information entry data is prohibited in the cordless handset 2. Therefore, if only the cordless handset 2 is stolen or given to another person, the cordless handset 2 leaves the area for communication with the base unit 1. Accordingly, the personal information entry data stored in the cordless handset 2 is protected from being released to another person.

At S44, the communication device may be configured such that the personal information security function will be enabled in the cordless handset 2 in accordance with the value of the security function flag F1 that is received from the base unit 1. In this case, the communication device may be configured such that the setting of the security function flag F3 cannot be performed in the cordless handset 2 and the setting of the personal information security function is performed in the base unit 1 so that the personal information security function will be enabled in the communication device including both of the base unit 1 and the cordless handset 2.

Although not shown in FIG. 11, the personal information security function of the base unit 1 may be canceled by the cordless handset 2 through which the password is entered therein.

While the invention has been described in detail with reference to the above illustrative embodiment thereof, it would be apparent to those skilled in the art that various changes, arrangements and modifications may be applied therein without departing from the spirit and scope of the invention. In the above-described illustrative embodiment, all of the personal information entry data stored in the EEPROM 35 of the base unit 1 or stored in the EEPROM 55 of the cordless handset 2 are subject to protection. However, the invention is not limited to the above-described illustrative embodiment. For example, a part of the personal information entry data, such as only the telephone numbers and the facsimile numbers, may be subject to the protection.

In the above description, mainly, the information of the telephone directory and the history data to be stored in the EEPROMs has been taken as an example of the personal information entry data. However, the personal information entry data is not limited to this information or data, the personal information entry data may include received facsimile data, facsimile data to be transmitted which is stored for memory transmission, messages recorded by the telephone answering and message recording function, which are mainly stored in the RAM. When the security function flags are set to "1", the password entry may be required to access the information or data. If an invalid password is entered, the information or data cannot be accessed. The stored information, such as a telephone number, may be displayed on the display by which a one-touch key or an abbreviated key is operated to make a call. Therefore, if the security function flags are set to "1", password entry is required for the call. If an invalid password is entered, the key operation may be not accepted.

The internal configuration of the base unit 1 and the cordless handset 2 is not limited to the specific illustrative embodiment shown in FIG. 2. The messages to be displayed on the display 18 of the base unit 1 and the display 22 of the cordless handset 2 are not limited to those shown in FIGS. 5, 6, 7, 9, and 10. In the above-described illustrative embodiment, the communication device is implemented by the public telephone line 17 connected thereto. Instead, the communication device may be implemented by an internet network using an IP telephone.

Aspects of the invention can be applied to other equipment or devices which are used by connecting their power plugs with outlets at all times and store various information or data therein. For example, aspects of the invention can be applied to HDD/DVD players, personal computers, or household electrical products such as refrigerators with memory.

What is claimed is:

1. A communication device comprising:
   storage configured to store information;
   an output device configured to output the information;
   a power supply detector configured to
      detect whether an external source is coupled to the communication device and supplying power to the communication device;
      detect that the external power source is uncoupled from the communication device and not supplying power to the communication device,
      detect that an external source is again coupled to the communication device and supplying power to the communication device, and
      determine an amount of time from when the external power source is uncoupled from the communication device and not supplying power to the communication device to when an external source is again coupled to the communication device and supplying power to the communication device; and
   a processor configured to
      determine whether the amount of time determined has reached a threshold, and
      prohibit the stored information from being output by the output device based on whether the amount of time is determined to have reached the threshold, responsive to the power supply detector detecting that an external source is again coupled to the communication device and supplying power to the communication device.

2. The communication device according to claim 1, wherein the processor is configured to detect whether the information is stored in the storage,
   wherein the processor is configured to prohibit the stored information from being output by the output device in response to detecting the information in the storage and the amount of time being determined has reached the threshold.

3. The communication device according to claim 2, wherein the processor is configured to detect whether the information is stored in the storage when the power supply detector has detected the supply of power to the communication device.

4. The communication device according to claim 2, wherein the processor is further configured to:
   detect whether a request for output of the information from the storage has been made, and
   request a user to enter identification information when the request for output of the information has been detected and the output of the information has been prohibited.

5. The communication device according to claim 4, wherein the processor is further configured to:
   predetermine the identification information,
   remove the output prohibition of the information through the output device, when the identification information entered by the user in response to the request for the identification information matches the predetermined identification information, and
   maintain the output prohibition of the information when the entered identification information does not match the predetermined identification information.

6. The communication device according to claim 5, wherein the processor is further configured to set a flag,
   the flag configured to be set to on when the information in the storage has been detected, and
   the flag configured to be set to off when the identification information entered by the user in response to the request for the identification information matches the predetermined identification information.

7. The communication device according to claim 2, wherein the processor is further configured to:
   determine whether an output prohibiting function is to be enabled, and
   detect whether there is information stored in the storage if the output prohibition function is enabled.

8. The communication device according to claim 2, wherein the processor is configured to allow the output of the information when the power supply detector has determined that the amount of time has not reached the threshold.

9. The communication device according to claim 2, further comprising a transmitter/receiver configured to transmit and receive data to and from an external terminal via a communications line, wherein the information includes at least one of information related to the external terminal, information related to the communication device, and data transmitted to or received from the external terminal.

10. A communication device comprising:
    a base unit; and
    a sub-unit configured to be wirelessly communicable with the base unit, the sub-unit including:
       sub-unit storage configured to store information;
       a sub-unit output device configured to output the information; and
       a sub-unit processor configured to:
          prohibit the stored information from being output by the sub-unit output device;
          detect whether the sub-unit is out of wireless communication range with the base unit; and
          prohibit the output of sub-unit side information based on a result of the detection whether the sub-unit is out of wireless communication range with the base unit.

11. The communication device according to claim 10, wherein the sub-unit processor is configured to prohibit the output of the sub-unit side information when the sub-unit is out of wireless communication range with the base unit.

12. The communication device according to claim 11, wherein the base unit includes:
    storage configured to store information;
    an output device configured to output the information; and
    a processor configured to prohibit the stored information from being output by the output device.

13. The communication device according to claim 12, further comprising a transmitter/receiver configured to transmit and receive data to and from an external terminal via a communications line, wherein the information includes at least one of information related to the external terminal, information related to the communication device, and data transmitted to or received from the external terminal.

14. The communication device according to claim 13, wherein the sub-unit side information includes at least one of information related to the external terminal, information related to the communication device, and data transmitted to or received from the external terminal.

15. The communication device according claim 14, wherein at least one of the information and the sub-unit side information includes a specific identification number which identifies the terminal when a communication is performed therebetween.

16. The communication device according claim 14, wherein at least one of the information and the sub-unit side information includes at least one of a history indicating a transmission and reception of sound data and a history indicating a transmission and reception of image data between the communication device and the external terminal.

17. The communication device according claim 14, wherein at least one of the information and the sub-unit side information includes at least one of image data and sound data received from the external terminal.

18. The communication device according to claim 13, wherein the data to be transmitted to and received from the external terminal includes at least one of sound data and image data.

19. The communication device according to claim 10, wherein the base unit includes:
  storage configured to store information;
  an output device configured to output the information; and
  a processor configured to prohibit the stored information from being output by the output device, and
  wherein the sub-unit processor is configured to:
    request the base unit to provide an operating status of the base unit; and
    prohibit output of the stored sub-unit side information by the sub-unit output device when the operating status of the base unit indicates that the stored information is prohibited from being output by the sub-unit output device.

20. A method for protecting information in a communication device including storage configured to store information and an output device configured to output the information, the method comprising the steps of:
  detecting that an external power source is uncoupled from the communication device and not supplying power to the communication device;
  detecting that an external source is again coupled to the communication device and supplying power to the communication device, and
  determining an amount of time from when the external power source is uncoupled from the communication device and not supplying power to the communication device when an external source is again coupled to the communication device and supplying power to the communication device; and
  prohibiting an output of the stored information by the output device, responsive to detecting that an external source is again coupled to the communication device and supplying power to the communication device, based on whether the determined amount of time has reached a threshold.

* * * * *